US006782762B2

United States Patent
Cage

(10) Patent No.: US 6,782,762 B2
(45) Date of Patent: Aug. 31, 2004

(54) CORIOLIS FLOWMETER WITH IMPROVED ZERO STABILITY

(75) Inventor: Donald R. Cage, Longmont, CO (US)

(73) Assignee: Direct Measurement Corporation, Longmont, CO (US)

(*) Notice: Subject to any disclaimer, the term of this patent is extended or adjusted under 35 U.S.C. 154(b) by 15 days.

(21) Appl. No.: 10/238,968

(22) Filed: Sep. 10, 2002

(65) Prior Publication Data

US 2004/0045371 A1 Mar. 11, 2004

(51) Int. Cl.[7] .............................................. G01F 1/84

(52) U.S. Cl. .............................................. 73/861.355

(58) Field of Search ...................... 73/861.354–861.357

(56) References Cited

U.S. PATENT DOCUMENTS 6,308,580 B1 * 10/2001 Crisfield et al. ....... 73/861.355

* cited by examiner

Primary Examiner—Harshad Patel
(74) Attorney, Agent, or Firm—Henry C. Query, Jr.

(57) ABSTRACT

A Coriolis mass flowmeter which comprises at least first and second generally parallel flowtubes, each of which includes a first half that is connected to an inlet manifold and a second half that is connected to an outlet manifold, a first brace bar which is attached to the first halves of the flowtubes, and a second brace bar which is attached to the second halves of the flowtubes. The first and second brace bars are oriented on the flowtubes such that, when the flowtubes are vibrated in at least one of a driven mode of vibration and a Coriolis mode of vibration, the resulting reaction forces at the inlet and outlet manifolds are less than those that exist when the first and second brace bars are oriented generally perpendicular to the flowtubes.

11 Claims, 8 Drawing Sheets

CORIOLIS FLOWMETER WITH IMPROVED ZERO STABILITY

BACKGROUND OF THE INVENTION

The present invention relates to dual flowtube Coriolis mass flowmeters which comprise two brace bars that are connected to the flowtubes to decouple certain extraneous modes of vibration from the desired driven and Coriolis modes of vibration of the flowtubes. More particularly, the invention relates to such a flowmeter wherein the brace bars are oriented on the flowtubes such that the reaction forces at the boundary conditions of the flowmeter are effectively reduced or eliminated, thereby improving the zero stability of the flowmeter.

Dual flowtube Coriolis mass flowmeters commonly comprise two identical flowtubes, an inlet manifold for connecting a first end of each flowtube to a first section of process piping through which a fluid to be measured flows, an outlet manifold for connecting a second end of each flowtube to a second section of the process piping, one or more force drivers for vibrating the flowtubes in one of their natural modes of vibration, such as the first bending mode of vibration, and a number of motion sensors for detecting the vibrating motion of the flowtubes. The flowtubes can have various configurations, such as S-shaped and U-shaped, and each flowtube lies in a plane that is parallel to the plane of the other flowtube. Furthermore, the force drivers are mounted so as to vibrate the flowtubes toward and away from each other in a direction which is perpendicular to the planes of the flowtubes.

As the fluid flows through the vibrating flowtubes it generates Coriolis forces that cause the flowtubes to deform into a unique and characteristic shape, which is commonly called the "Coriolis deflection". Thus, in operation the flowtubes are subject to a "driven" mode of vibration, which is generated by the force drivers, and a "Coriolis" mode of vibration, which results from the Coriolis forces acting on the flowtubes. As is well understood by those of ordinary skill in the art, the mass flow rate and certain other properties of the fluid can be determined from the Coriolis deflections of the flowtubes, which are measured by the motion sensors.

One problem with many prior art Coriolis mass flowmeters is their inability to maintain a stable "zero" signal, that is, the output of the meter in the presence of zero flow. In contrast to Coriolis mass flowmeters, mechanical positive displacement type flowmeters have an inherent zero. This results from the fact that, when fluid stops flowing through these meters, the flow detection mechanism also stops moving, thus allowing for the measurement of an absolute zero flow condition. Coriolis mass flowmeters on the other hand have a "live zero". This is due to the fact that the motion sensors are inherently incapable of determining whether the flowtube deflections are caused by the force drivers alone or by the Coriolis forces generated by fluid flowing through the vibrating flowtubes. Therefore, during installation and startup of the Coriolis mass flowmeter, the operator must usually shut off the flow through the meter and initiate a zeroing procedure, which essentially tells the meter that the measured flowtube deflections correspond to a zero flow condition.

However, the zero signal in certain prior art Coriolis mass flowmeters may be sensitive to changes in ambient conditions, such as the temperature and pressure of the fluid, external stresses on the flowtubes and extraneous vibrations on the process piping. These changes can cause the zero signal to "drift", which results in the meter indicating some amount of flow when in fact no flow exists, a condition which is often called "zero shift". A major cause of this problem is imbalance in the vibrating system of the meter, which primarily comprises the flowtubes and their attached hardware. This imbalance allows the vibrational energy to be transmitted out of the vibrating system and into the boundary conditions of the meter, which are generally taken to be the sections of the process piping to which the meter is connected. This vibrational energy will then be absorbed or reflected by the boundary conditions and, depending on the amplitude and phase of the absorbed or reflected energy, can cause a zero shift in the output of the flowmeter.

Brace bars are commonly used on dual flowtube Coriolis mass flowmeters to link the flowtubes together near where they connect to the inlet and outlet manifolds. In this manner, the brace bars serve to couple the vibrational energy of each flowtube to the other in order to keep the flowtubes vibrating in opposition to each other and thereby maintain the vibrating system in balance. Each brace bar is typically a flat metal plate having two transverse openings through which the flowtubes are received and secured, such as by brazing or welding. In addition, each brace bar is normally mounted such that the plane of the brace bar is generally perpendicular to the axes of the flowtubes. Consequently, the principal axes of the brace bar are also perpendicular to the axes of the flowtubes.

However, when the brace bars are mounted to the flowtubes in this fashion, their principal axes are normally not aligned with the effective mass centers of the flowtubes. As will be explained more fully below, the effective mass centers are the locations in space of four point masses of an equivalent mass-spring system which may be used to represent the vibrating system of the flowmeter. The misalignment between the principal axes of the brace bars and the effective mass centers of the corresponding halves of the flowtubes to which they are attached can cause the brace bars to deflect out of plane when the flowtubes are vibrated in the driven and Coriolis modes. These deflections can in turn create undesired reaction forces which may be transmitted to the boundary conditions of the flowmeter and thereby cause a zero shift in the output of the flowmeter.

SUMMARY OF THE INVENTION

In accordance with the present invention, these and other problems in the prior art are overcome by providing a Coriolis mass flowmeter which comprises at least first and second generally parallel flowtubes, each of which includes a first half that is connected to an inlet manifold and a second half that is connected to an outlet manifold, a first brace bar which is attached to the first halves of the flowtubes, and a second brace bar which is attached to the second halves of the flowtubes. Furthermore, the first and second brace bars are oriented on the flowtubes such that, when the flowtubes are vibrated in at least one of a driven mode of vibration and a Coriolis mode of vibration, the resulting reaction forces at the inlet and outlet manifolds are less than those that exist when the first and second brace bars are oriented generally perpendicular to the flowtubes. In a preferred embodiment of the invention, the first and second brace bars are oriented on the flowtubes such that, when the flowtubes are vibrated in at least one of a driven mode of vibration and a Coriolis mode of vibration, the resulting reaction forces on the inlet and outlet manifolds are approximately zero.

When oriented in this fashion, the brace bars will be subjected to little or no out of plane deflections from the driven and Coriolis modes of vibration of the flowtubes. Consequently, the reaction forces on the boundary conditions will be minimized or eliminated. Therefore, the detrimental effects that these reaction forces have on the zero stability of the flowmeter will likewise be minimized or reduced.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
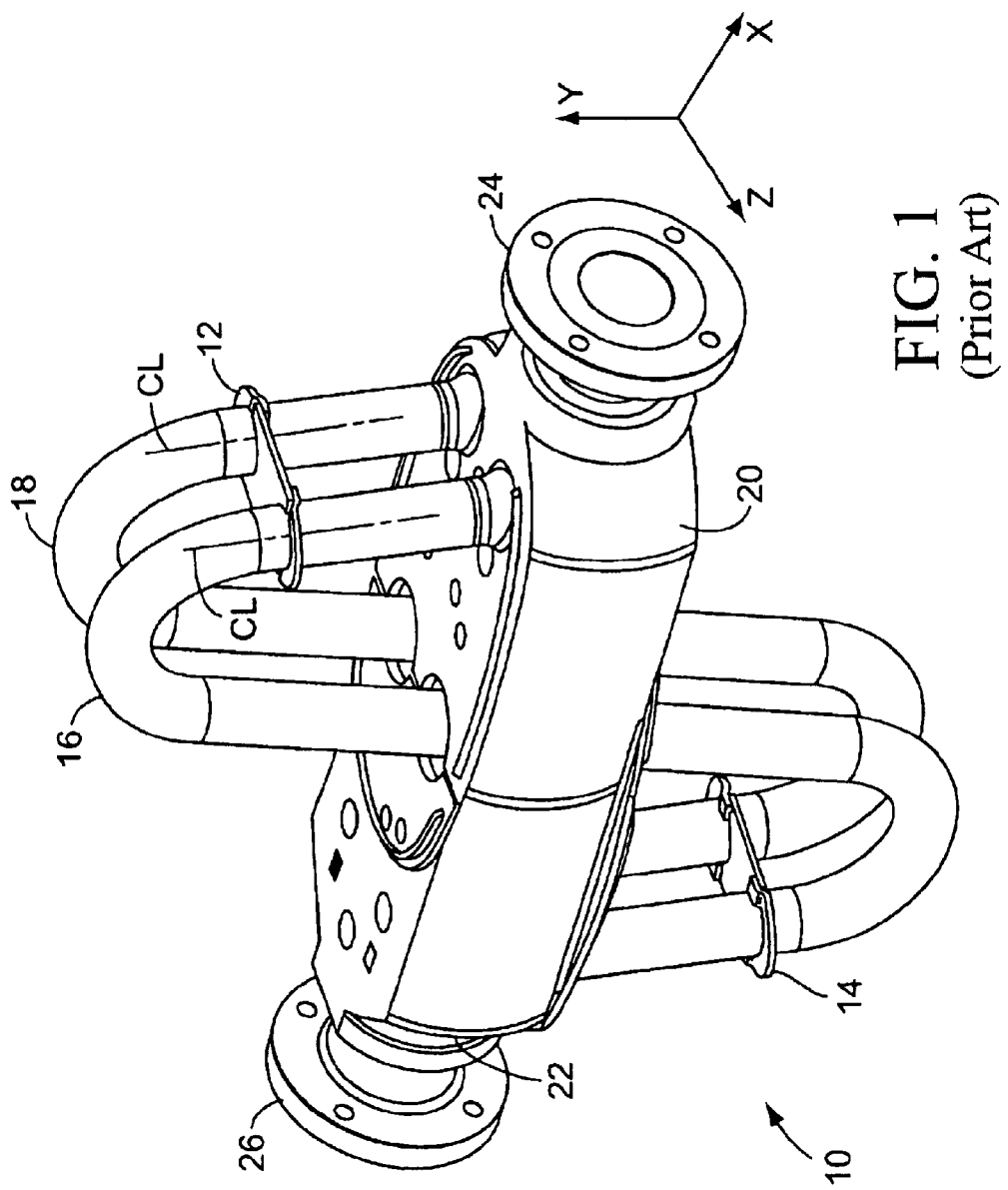
FIG. 1 is a perspective view of an exemplary dual flowtube Coriolis mass flowmeter with a pair of conventional brace bars mounted thereon.
Figure 2:
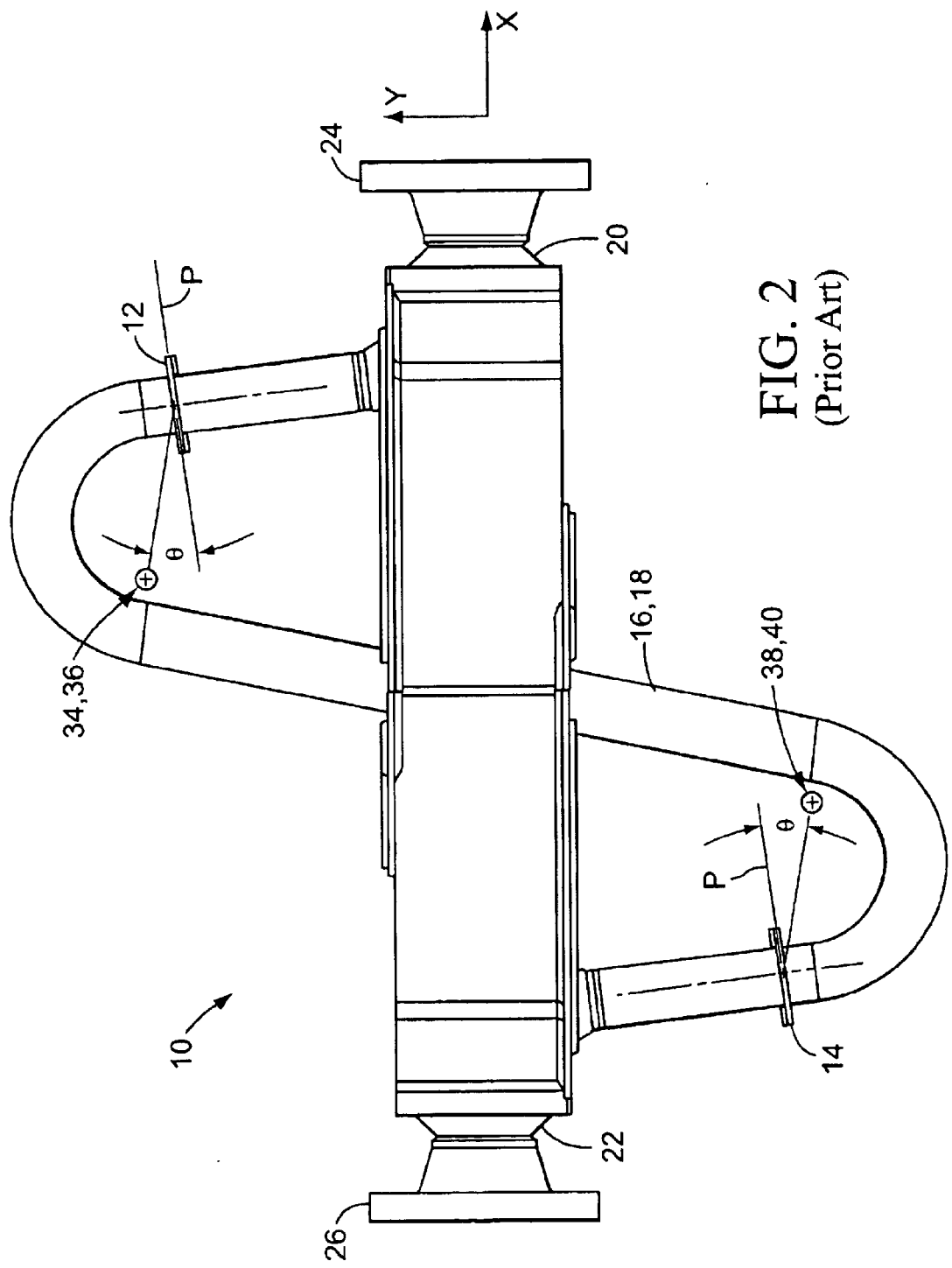
FIG. 2 is a front elevation view of the Coriolis mass flowmeter of FIG. 1.

Referring to FIGS. 1 and 2, an exemplary dual flowtube Coriolis mass flowmeter 10 is shown with a pair of conventional brace bars 12 and 14 mounted thereon in a conventional fashion. The flowmeter 10 comprises two parallel flowtubes 16 and 18 which each extend between an inlet manifold 20 and an outlet manifold 22 and which each comprise a centerline CL at the point of attachment of the brace bars 12, 14. The inlet and outlet manifolds 20, 22 are attached to respective flange connections 24, 26 which in turn are connected to corresponding sections of process piping, such as a pipeline (not shown), through which a fluid to be measured is permitted to flow. The flowmeter 10 also includes one or more force drivers for vibrating the flowtubes in one of their natural modes of vibration, such as their first bending mode of vibration, and a number of motion sensors for detecting the vibrating motion of the flowtubes. For purposes of simplicity, the force drivers and the motion sensors have been omitted from the Figures.

In operation, fluid entering the inlet manifold 20 is split into two substantially equal streams and directed into the flowtubes 16, 18. The force drivers causes the flowtubes 16, 18 to deflect toward and away from each other in a predetermined driven mode of vibration. However, as the fluid flows through the vibrating flowtubes it generates Coriolis forces that cause the flowtubes to additionally deflect in a Coriolis mode of vibration. Using the coordinate system shown in the Figures, both the driven deflections and the Coriolis deflections are in the Z-direction, which is perpendicular to the X-Y planes of the flowtubes 16, 18. The motion sensors generate signals indicative of the Coriolis vibrations of the flowtubes and transmit these signals to a suitable processing and control circuit (not shown), which then uses the signals to calculate the mass flow rate of the fluid in a manner that is well understood by those of ordinary skill in the art.

Figure 5:
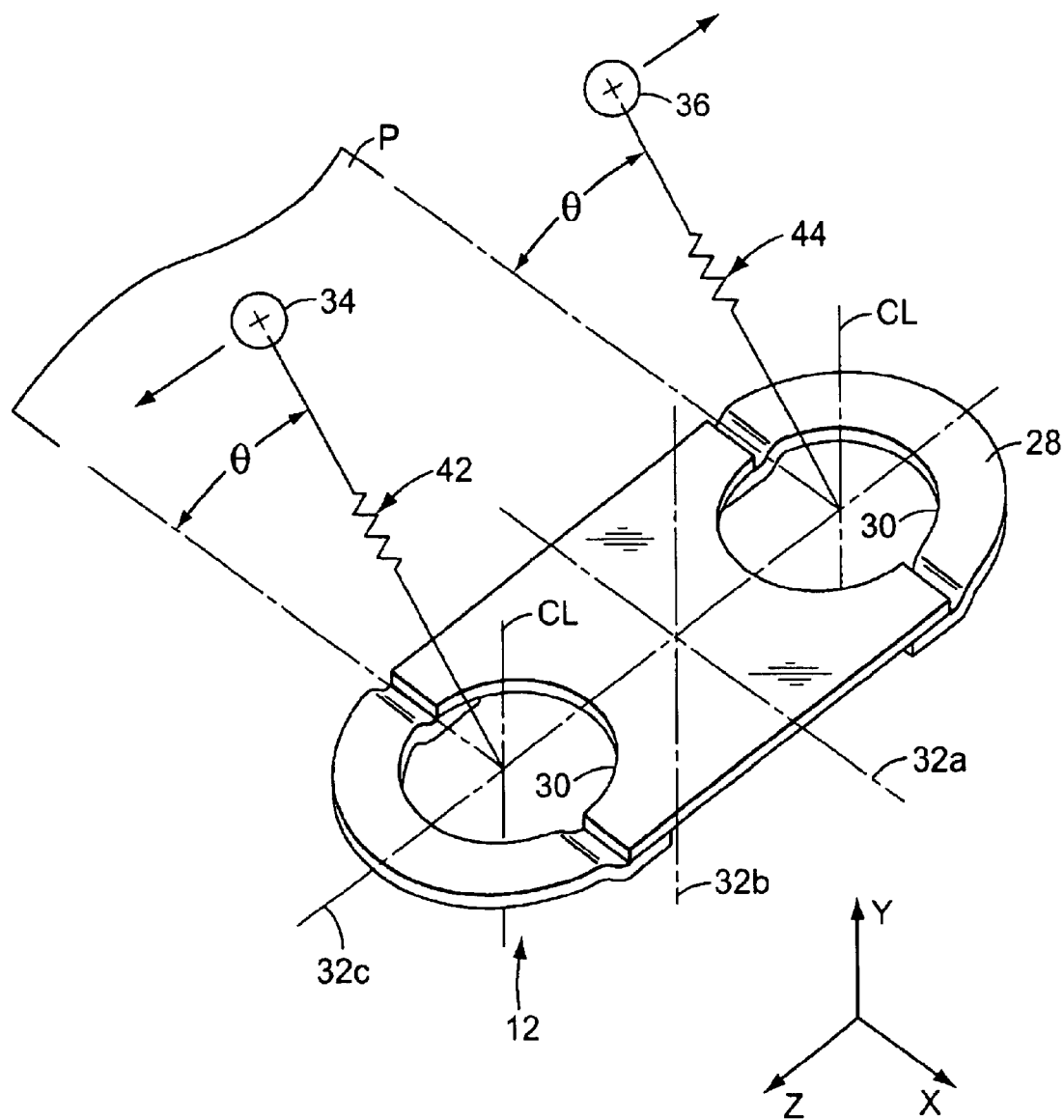
FIG. 5 is a representation of an equivalent mass-spring system for the right-half portion of the Coriolis mass flowmeter of FIG. 1.

Referring to FIG. 5, each brace bar 12, 14 is shown to comprise a generally flat body 28 and a number of openings 30 that extend substantially transversely through the body. The number of openings 30 corresponds to the number of flowtubes 16, 18, and each flowtube is received in and secured to its corresponding opening in a conventional manner, such as by brazing or welding. As shown in FIG. 1, each brace bar 12, 14 is mounted proximate a corresponding inlet and outlet manifold 20, 22, and the force drivers and motion sensors (not shown) are located between the brace bars.

The body 28 is a generally planar member which comprises a first principal axis 32a, a second principal axis 32b and a third principal axis 32c. The principal axes 32a, 32b and 32c are the principal axes of inertia of the body 28. For the generally flat symmetrical body 28 illustrated in the Figures, the first principal axis 32a is the line which passes through the centroid of the body in the X-direction, the second principal axis 32b is the line which passes through the centroid of the body in the Y-direction and the third principal axis 32c is the line which passes through the centroid of the body in the Z-direction. For other brace bar shapes, the principal axes of inertia can be determined using well know techniques. As used herein, the phrase "plane of the brace bar" will be used to denote the plane defined by the first and third principal axes.

In the prior art Coriolis mass flowmeter 10 illustrated in FIGS. 1 and 2, the brace bars 12, 14 are oriented on the flowtubes 16, 18 in the conventional manner, that is, with the plane of the brace bar generally aligned with a plane P which is perpendicular to the centerlines CL of the flowtubes. In this arrangement, the brace bar 12 serves to effectively couple the right halves of the flowtubes 16, 18 while the brace bar 14 serves to effectively couple the left halves of the flowtubes. For reasons which will be discussed below, the effective masses of the right halves of the flowtubes 16, 18 can be symbolically represented as point masses 34 and 36, respectively. Similarly, the effective masses of the left halves of the flowtubes 16, 18 can be symbolically represented as point masses 38 and 40, respectively. These point masses, and their positions relative to the actual right and left halves of the flowtubes 16, 18, are shown in FIG. 2.

As an aid to understanding the present invention, the vibrating system of the flowmeter 10 can be represented by an equivalent mass-spring system comprising the four point masses 34, 36, 38 and 40. Moreover, due to the symmetry of the flowmeter 10, the equivalent mass-spring system for the right half of the vibrating system will be similar to that of the left half of the vibrating system. Therefore, for purposes of simplicity the equivalent mass-spring system for the vibrating system of the flowmeter 10 will be described herein with reference to only the right half of the vibrating system.

Figure 3:
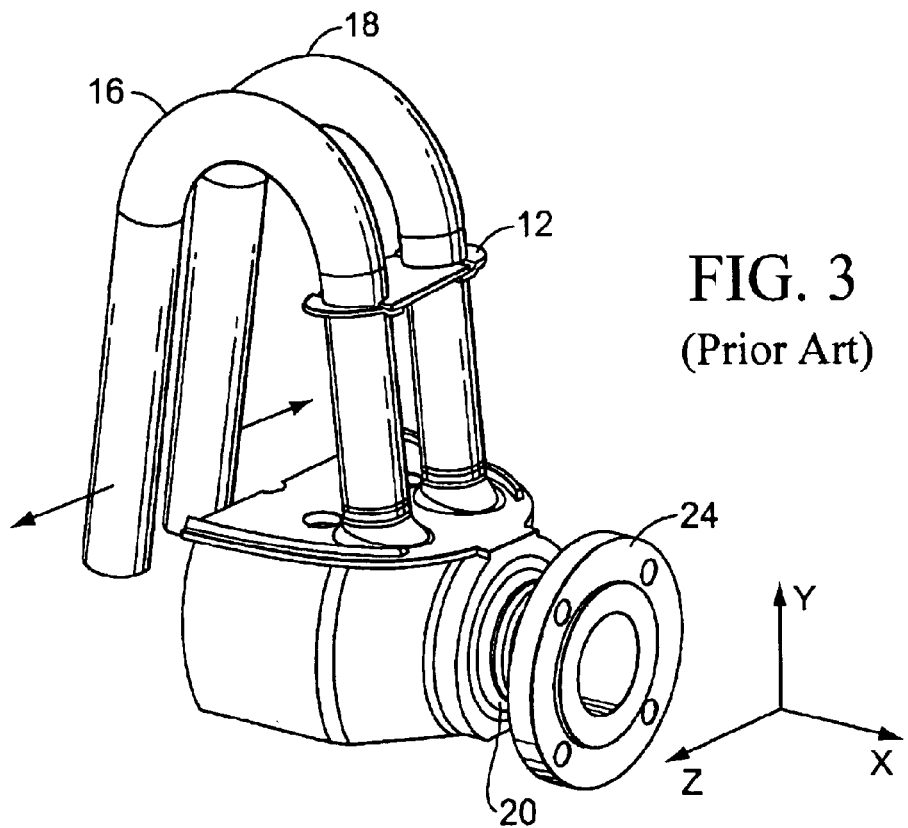
FIG. 3 is a perspective view of the right-half portion of the Coriolis mass flowmeter of FIG. 1.
Figure 4:
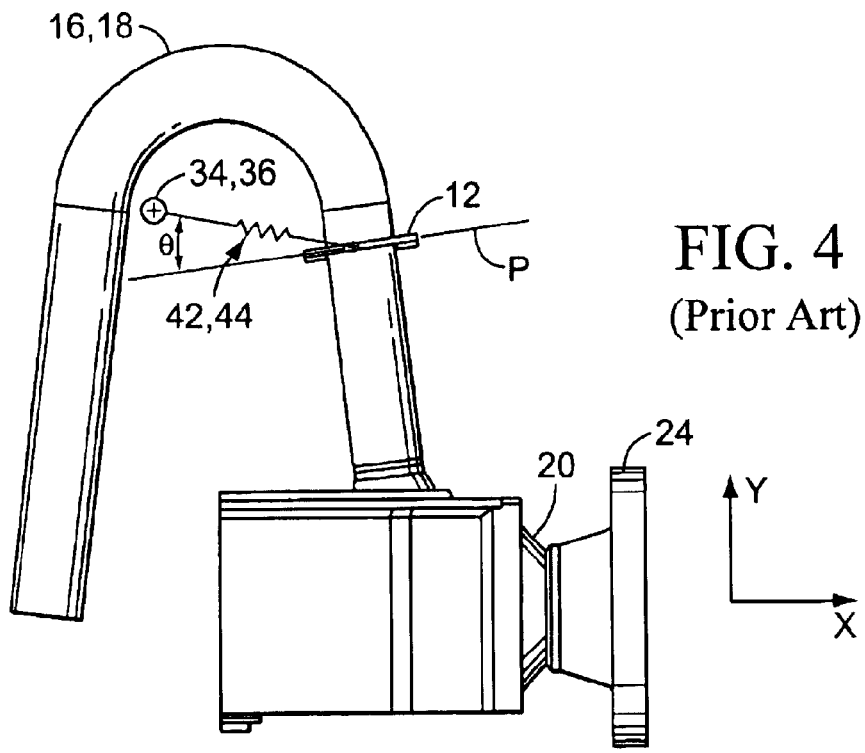
FIG. 4 is a front elevation view of the right-half portion of the Coriolis mass flowmeter of FIG. 1.

Referring to FIGS. 3 through 5, in the equivalent mass-spring system for the right half of the vibrating system each point mass 34, 36 represents the effective vibrational mass of the right half of a corresponding flowtube 16, 18. In addition, the stiffness of each flowtube 16, 18 is represented by a corresponding spring 42, 44 which is connected between each point mass 34, 36 and the brace bar 12. In this equivalent mass-spring system, the locations of the point masses 34, 36 can be defined as the "effective mass centers" of the right halves of the flowtubes 16, 18. In other words, the effective mass centers are the points in space where the moving masses of the right halves of the flowtubes 16, 18 can, for a given mode of vibration, be "lumped" as point masses and, together with their associated springs 42, 44, form an equivalent system that has the same modes of vibration and the same reaction forces as the real vibrating system.

Thus, the equivalent mass-spring system for the right half of the vibrating system, which is shown isolated in FIG. 5, would have a natural mode of vibration similar to the driven mode of vibration of the flowtubes 16, 18, wherein the point masses 34, 36 and their associated springs 42, 44 are vibrated in opposition to each other in the Z-direction just as the flowtubes 16, 18 of the real vibrating system. Moreover, when vibrated in the driven mode, the point masses 34, 36 and their associated springs 42, 44 will generate reaction forces on the brace bar 12 of a type and magnitude similar to those generated by the flowtubes 16, 18 in the real vibrating system.

As shown in FIG. 5, when the brace bar 12 is oriented on the flowtubes 16, 18 in the conventional manner, that is, with the plane of the brace bar perpendicular to the centerlines CL, the plane of the brace bar is not aligned with the effective mass centers 34, 36 of the flowtubes but is instead oriented at an angle θ relative to the effective mass centers. This misalignment between the brace bar 12 and the effective mass centers causes the flowtubes 16, 18 to deflect the brace bar out of the plane of the brace bar as they vibrate. This out of plane deflection in turn generates undesired imbalance forces in the X and Y directions which are transmitted through the manifold 20 and the flange connection 24 to the process piping. The resulting reaction forces which are generated at the boundary conditions, which can be detected at the manifold 20, represent an energy loss from the vibrating system to the boundary conditions that can cause a zero shift in the flow measurement signal, that is, a shift from an accurate value to an erroneous value.

Figure 6:
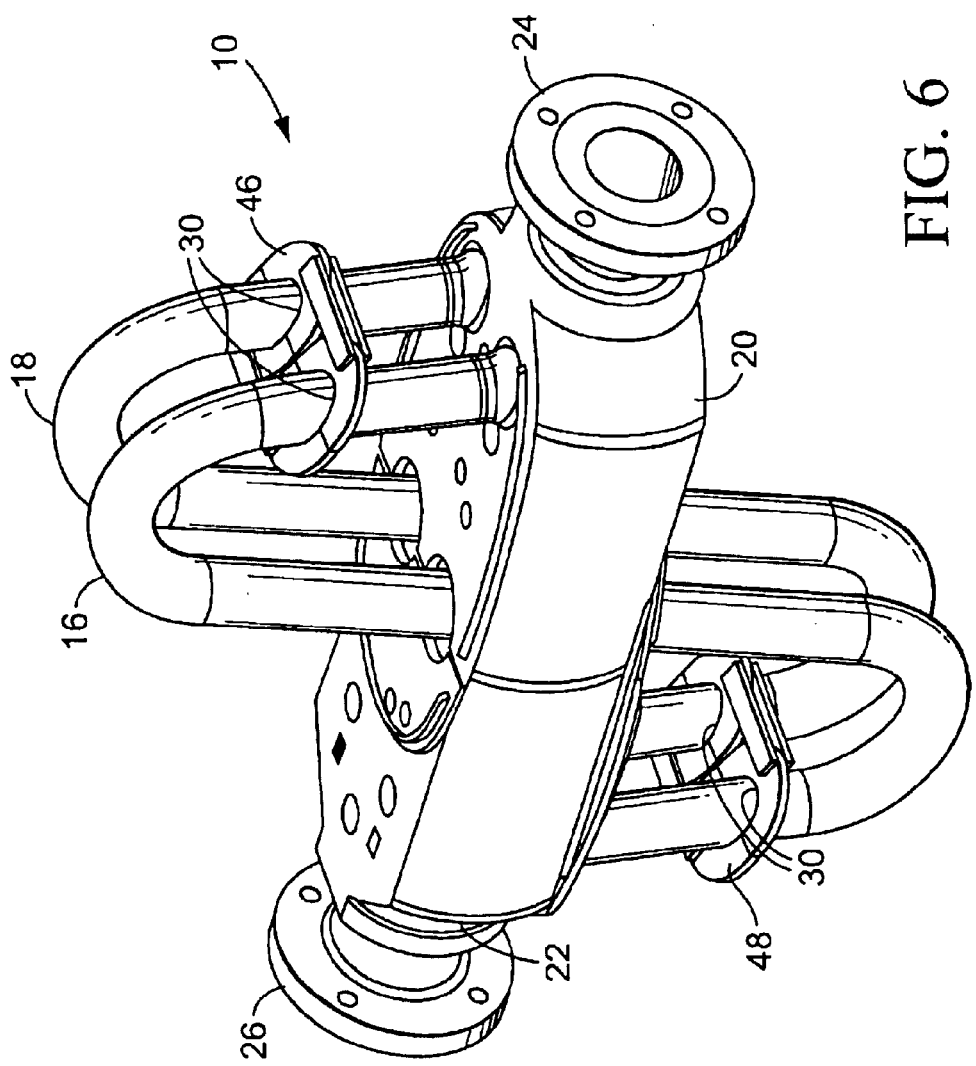
FIG. 6 is a perspective view of an exemplary dual flowtube Coriolis mass flowmeter with a pair of brace bars of the present invention mounted thereon.
Figure 7:
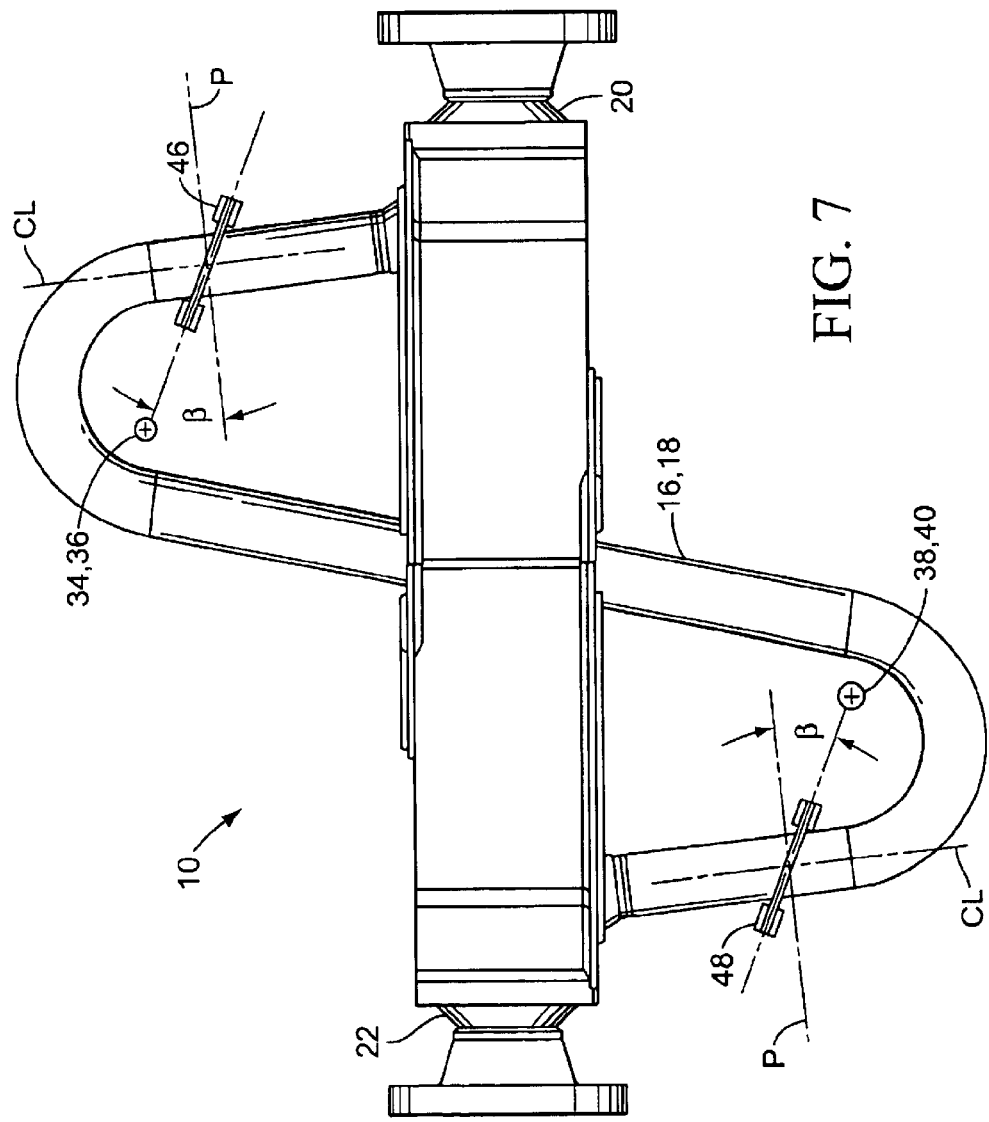
FIG. 7 is a front elevation view of the Coriolis mass flowmeter of FIG. 6.

In accordance with the present invention, the out of plane deflections of the brace bars are minimized or eliminated by orienting the brace bars on the flowtubes such that the plane of each brace bar is better aligned with the effective mass centers of the corresponding halves of the flowtubes to which it is mounted. Referring to FIGS. 6 and 7, the Coriolis mass flowmeter 10 is shown with two modified brace bars 46, 48 mounted to its flowtubes 16, 18. The brace bars 46, 48 can be similar to any conventional brace bar, such as those described in U.S. Pat. No. 6,415,668, which is hereby incorporated herein by reference. As such, the brace bars 46, 48 each comprise two openings 30 through which the flowtubes 16, 18 are received, and first, second and third principal axes of inertia similar to the principal axes 32a, 32b and 32c discussed above. Furthermore, the plane of each brace bar 46, 48 is the plane defined by the first and third principal axes.

As shown most clearly in FIG. 7, each brace bar 46, 48 is oriented on the flowtubes 16, 18 such that the plane of the brace bar is more closely aligned with the effective mass centers of the corresponding halves of the flowtubes to which the brace bar is attached. Thus, in contrast to the prior art, wherein the plane of each brace bar is aligned with the plane P perpendicular to the centerlines CL of the flowtubes, in the present invention the plane of each brace bar 46, 48 is inclined at an angle β relative to the plane P. In a preferred embodiment of the invention, the plane of each brace bar 46, 48 is inclined at an angle β of greater than 0° relative to the plane P. More preferably, the plane of each brace bar 46, 48 is inclined at an angle β relative to the plane P such that the plane of the brace bar will be aligned with the effective mass centers of the flowtubes. In this manner, the above-described reaction forces at the boundary conditions will be minimized or eliminated.

Figure 8A:
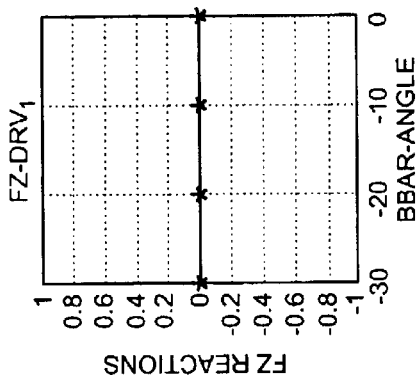
FIGS. 8A through 8F are graphs of the imbalance forces, determined through finite element analysis, which are caused by the driven mode of vibration with the brace bars of the present invention mounted at various angles relative to the flowtubes.
Figure 8D:
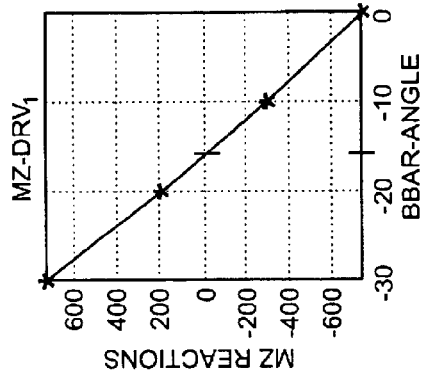
Figure 8B:
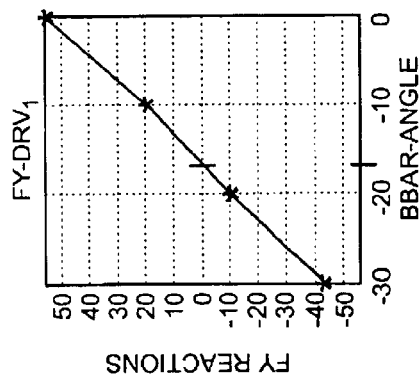
Figure 8E:
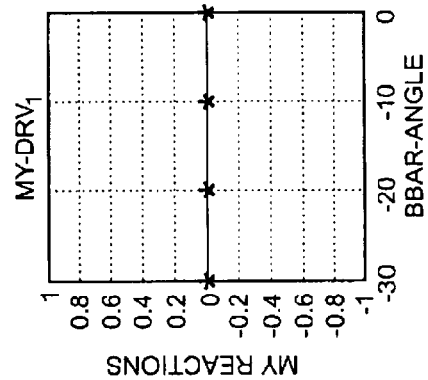
Figure 8C:
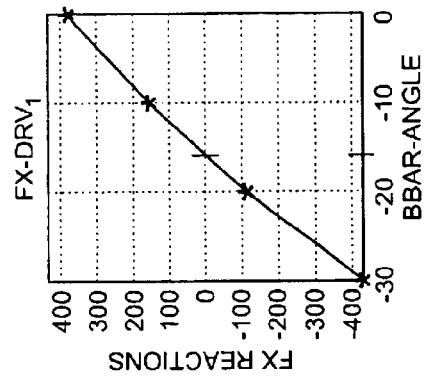
Figure 8F:
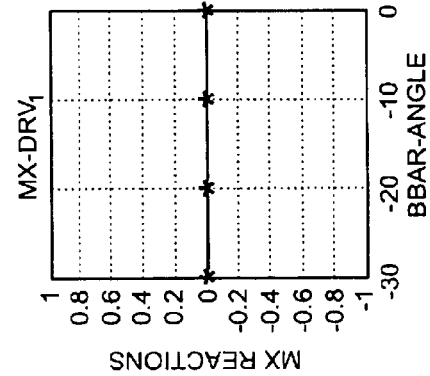
Figure 9A:
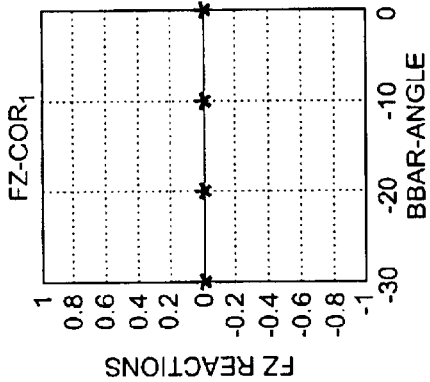
FIGS. 9A through 9F are graphs of the imbalance forces, determined through finite element analysis, which are caused by the Coriolis mode of vibration with the brace bars of the present invention mounted at various angles relative to the flowtubes.
Figure 9D:
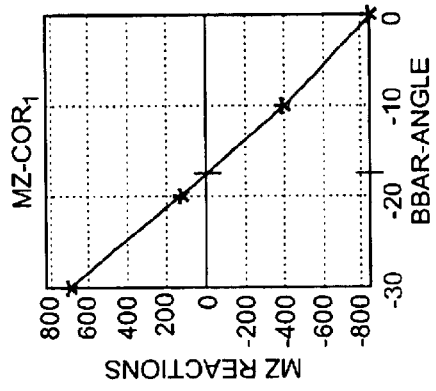
Figure 9B:
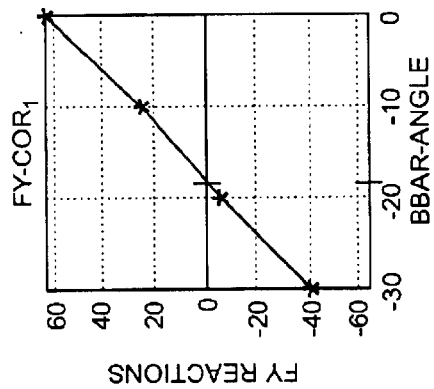
Figure 9E:
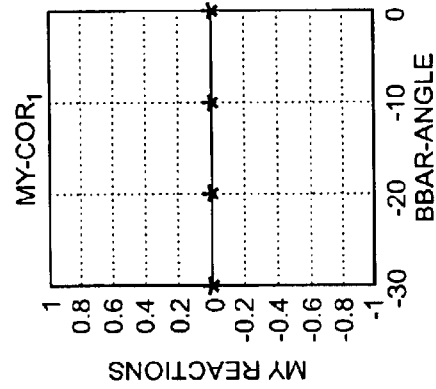
Figure 9C:
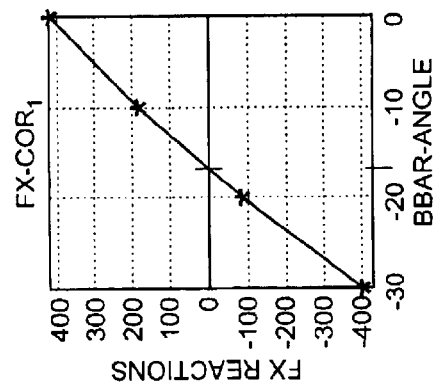
Figure 9F:
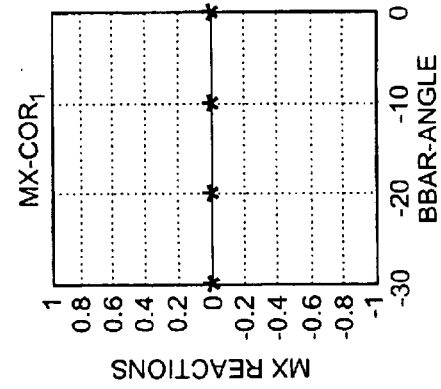

In accordance with the present invention, the ideal angle β at which the plane of each brace bar 46, 48 is oriented relative to the plane P is the angle at which the reaction forces measured at the manifolds 20, 22 are minimized. The results of orienting the brace bars 46, 48 in this manner are illustrated in FIGS. 8A through 8F. These graphs represent actual finite element analysis results showing the reaction forces generated at the boundary conditions as a function of the angle β of the plane of each brace bar 46, 48 relative to the plane P. In these Figures, all six possible reaction forces, or degrees of freedom, are shown for a range of angles β. As shown in FIGS. 8A, 8B and 8F, for forces in the X-direction (FX), forces in the Y-direction (FY), and moments about the Z-direction (MZ), large non-zero values may occur depending on the angle β. However, for the other three degrees of freedom (FZ, MX and MY), the angle β generally has no effect on the reaction forces, especially when the flowtubes are designed to be equal and opposite. Thus, in the illustrative embodiment of the invention described herein, one may conclude from FIGS. 8A through 8F that the plane of each brace bar 46, 48 should be oriented at an angle β of approximately 15° relative to the plane P in order to minimize or eliminate all of the reaction forces at the boundary conditions. At this angle, the plane of each brace bar will be substantially aligned with the effective mass centers of the corresponding halves of the flowtubes 16, 18.

In order to facilitate the mounting of the brace bars 46, 48 to the flowtubes 16, 18, the openings 30 may be drilled or otherwise formed such that they are oriented at the angle β relative to the plane of the brace bar.

It should be noted that the specific angle β at which the brace bars 46, 48 are oriented will vary depending on several factors, including the shape of the flowtubes, the mass loading on the flowtubes from magnets, coils, brackets, and other devices, the design of the brace bars, and the locations of the brace bars along the flowtubes. Therefore, each design needs to be evaluated to determine the optimal angle β at which all of the reaction forces are minimized. In accordance with the present invention, the angle β may be determined by modeling the specific flowmeter in question and performing finite element analyses on this model with the brace bars mounted at a range of angles to determine the reaction forces at the boundary conditions, as in the example discussed above. The angle β at which all of the reaction forces are minimized or eliminated is then selected to be the desired angle at which the brace bars should be oriented relative to the plane P.

The above description has been undertaken in the context of the driven mode of vibration of the flowtubes. However the principals discussed herein also apply to other modes of vibration of the flowtubes, and in particular the Coriolis mode of vibration of the flowtubes, which is the mode that is excited by the Coriolis forces. The Coriolis mode of vibration is important to the overall performance of the flowmeter because it contributes greatly to the frequency response of the flowmeter, that is, the "sensitivity" of the flowmeter to the mass flow rate. Similar to the above discussion regarding the importance of minimizing the reaction forces which are caused by the driven mode of vibration, the same design goal applies to the Coriolis mode of vibration: the reaction forces which are caused by the Coriolis mode of vibration should be minimized or eliminated as well. The only difference between a design in which the reaction forces are minimized for the driven mode and one in which those forces are minimized for the Coriolis mode is the location of the effective mass centers of the flowtubes for each mode.

Here again, by using finite element analysis to determine the reaction forces at the boundary conditions as a function of the angle $\beta$, the designer can determine the optimal angle $\beta$ at which the reaction forces are minimized or eliminated. FIGS. 9A through 9F are graphs of the Coriolis mode reaction forces as a function of the angle $\beta$ for the illustrative embodiment of the invention shown in FIG. 6. By comparison with FIGS. 8A through 8F, FIGS. 9A through 9F show that for this design both the driven mode and the Coriolis mode reaction forces are minimized at an angle $\beta$ of approximately 15°. This coincidence of both the driven mode and the Coriolis mode reaction forces being zero at the same angle $\beta$ may not be usual. In general, therefore, the optimum angle $\beta$ is one at which both the driven mode and the Coriolis mode reaction forces are minimized.

Sometimes multiple sets of brace bars are used on each half of a flowmeter to further reduce the reaction forces. The above analysis regarding the alignment of the principal axes of the brace bars with the effective mass centers of the flowtubes becomes more complicated when multiple sets of brace bars are used because the "secondary" set of brace bars, that is, the ones closest to the inlet and outlet manifolds, are generally parallel to the "primary" set of brace bars. Consequently, the principal axes of the secondary brace bars would not be aligned with the effective mass centers. However, the present invention is intended to be applicable to multiple sets of brace bars in that they can be designed to be either parallel or non-parallel, provided that at some angle, or set of angles, the reaction forces for the driven mode and/or the Coriolis mode are minimized or eliminated.

It should be recognized that, while the present invention has been described in relation to the preferred embodiments thereof, those skilled in the art may develop a wide variation of structural and operational details without departing from the principals of the invention. For example, the various elements illustrated in the different embodiments may be combined in a manner not illustrated above. Therefore, the appended claims are to be construed to cover all equivalents falling within the true scope and spirit of the invention.

What is claimed is:

1. In combination with a Coriolis mass flowmeter which includes at least first and second generally parallel flowtubes, each of which comprises a first half that is connected to an inlet manifold and a second half that is connected to an outlet manifold, the improvement comprising:
   a first brace bar which is attached to the first halves of the flowtubes; and
   a second brace bar which is attached to the second halves of the flowtubes;
   wherein each of the first and second brace bars is oriented on the flowtubes at an angle other than generally perpendicular to the flowtubes;
   wherein when the flowtubes are vibrated in at least one of a driven mode of vibration and a Coriolis mode of vibration, the resulting reaction forces at the inlet and outlet manifolds are less than those that exist when the first and second brace bars are oriented generally perpendicular to the flowtubes.

2. The Coriolis mass flowmeter of claim 1, wherein the first and second brace bars are oriented on the flowtubes such that, when the flowtubes are vibrated in at least one of a driven mode of vibration and a Coriolis mode of vibration, the resulting reaction forces on the inlet and outlet manifolds are approximately zero.

3. The Coriolis mass flowmeter of claim 1, wherein the first and second brace bars are oriented on the flowtubes such that, when the flowtubes are vibrated in both a driven mode of vibration and a Coriolis mode of vibration, the resulting reaction forces on the inlet and outlet manifolds are less than those that exist when the first and second brace bars are oriented generally perpendicular to the flowtubes.

4. The Coriolis mass flowmeter of claim 3, wherein the first and second brace bars are oriented on the flowtubes such that, when the flowtubes are vibrated in both a driven mode of vibration and a Coriolis mode of vibration, the resulting reaction forces on the inlet and outlet manifolds are approximately zero.

5. A Coriolis mass flowmeter which includes:
   at least first and second generally parallel flowtubes, each of which comprises a first half that is connected to an inlet manifold and a second half that is connected to an outlet manifold;
   a first brace bar which is attached to the first halves of the first and second flowtubes;
   a second brace bar which is attached to the second halves of the first and second flowtubes;
   the first halves of the flowtubes comprising a first pair of centerlines defined at the first brace bar;
   the second halves of the flowtubes comprising a second pair of centerlines defined at the second brace bar;
   each brace bar comprising a plane which is defined by at least two principal axes of the brace bar;
   the first brace bar being oriented on the flowtubes such that its plane is inclined at a first angle relative to a first imaginary plane which is perpendicular to the first pair of centerlines; and
   the second brace bar being oriented on the flowtubes such that its plane is inclined at a second angle relative to a second imaginary plane which is perpendicular to the second pair of centerlines.

6. The Coriolis mass flowmeter of claim 5, wherein the first and second angles are such that, when the flowtubes are vibrated in at least one of a driven mode of vibration and a Coriolis mode of vibration, the resulting reaction forces on the inlet and outlet manifolds are less than those that exist when the first and second angles are approximately zero.

7. The Coriolis mass flowmeter of claim 6, wherein the first and second angles are such that, when the flowtubes are vibrated in at least one of a driven mode of vibration and a Coriolis mode of vibration, the resulting reaction forces on the inlet and outlet manifolds are approximately zero.

8. The Coriolis mass flowmeter of claim 5, wherein the first and second angles are such that, when the flowtubes are vibrated in both a driven mode of vibration and a Coriolis mode of vibration, the resulting reaction forces on the inlet and outlet manifolds are less than those that exist when the first and second angles are approximately zero.

9. The Coriolis mass flowmeter of claim 8, wherein the first and second angles are such that, when the flowtubes are vibrated in both a driven mode of vibration and a Coriolis mode of vibration, the resulting reaction forces on the inlet and outlet manifolds are approximately zero.

10. A method for orienting a brace bar on a Coriolis mass flowmeter having at least two flowtubes which each comprise a first half that is connected to an inlet manifold and a second half that is connected to an outlet manifold, the method comprising:

orienting the brace bar on the first halves of the flowtubes at a number of angles relative to the flowtubes;

for each angle, determining a set of first reaction forces at the inlet and outlet manifolds which result from vibrating the flowtubes in at least one of a driven mode of vibration and a Coriolis mode of vibration; and determining an angle for which the first reaction forces are generally minimal.

11. The method of claim 10, further comprising:

for each angle, determining a set of second reaction forces at the inlet and outlet manifolds which result from vibrating the flowtubes in both a driven mode of vibration and a Coriolis mode of vibration; and determining an angle for which the second reaction forces are generally minimal.

* * * * *